Patented Dec. 27, 1949

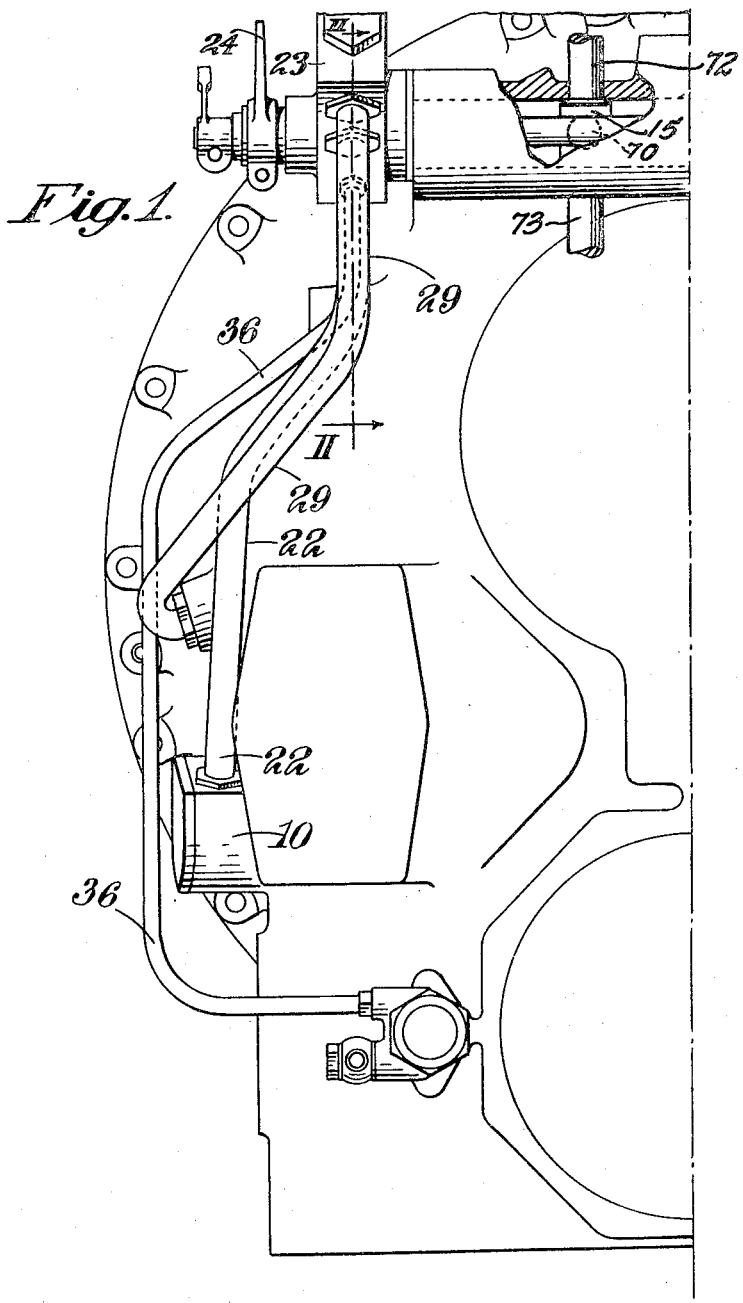

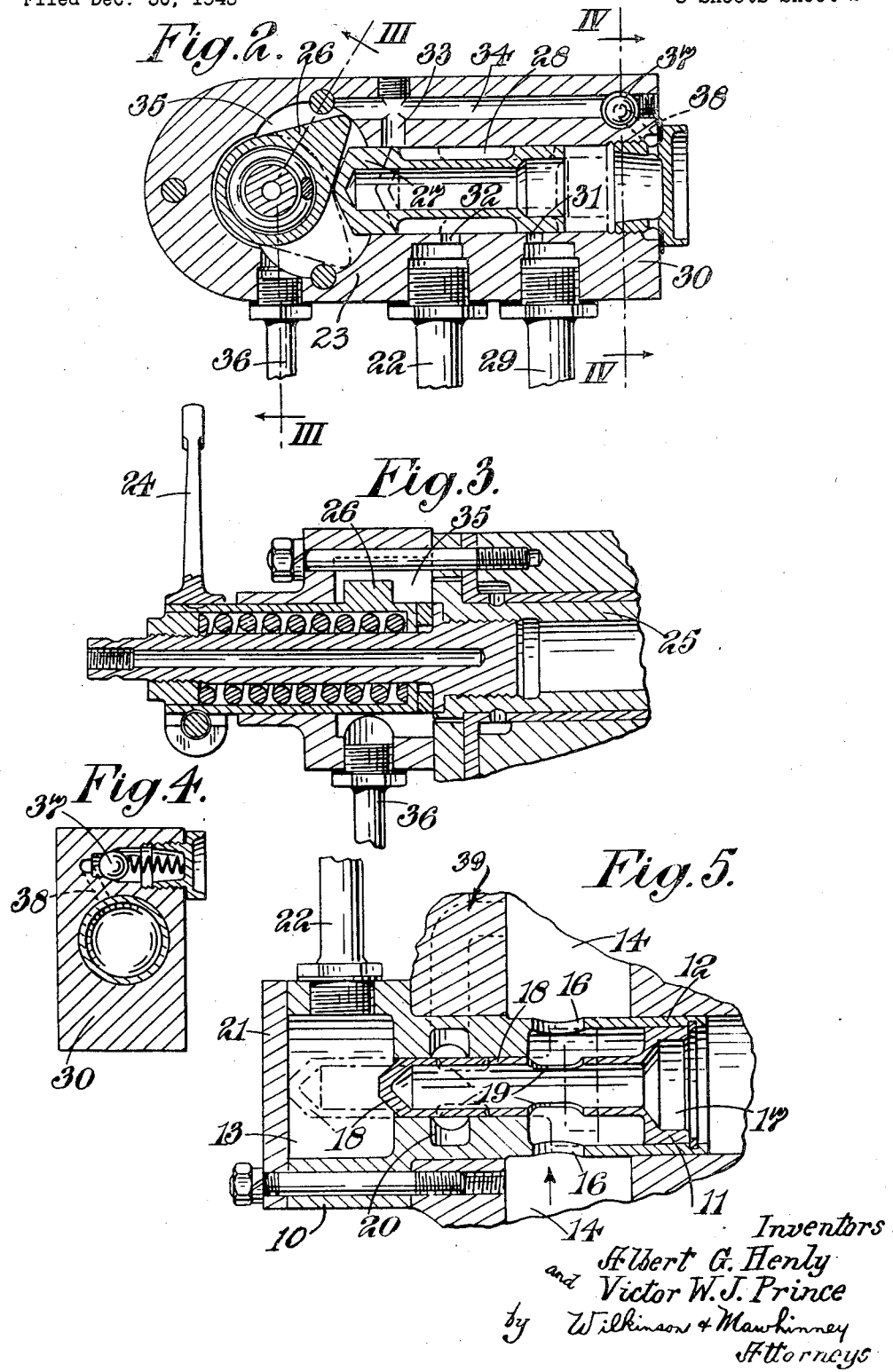

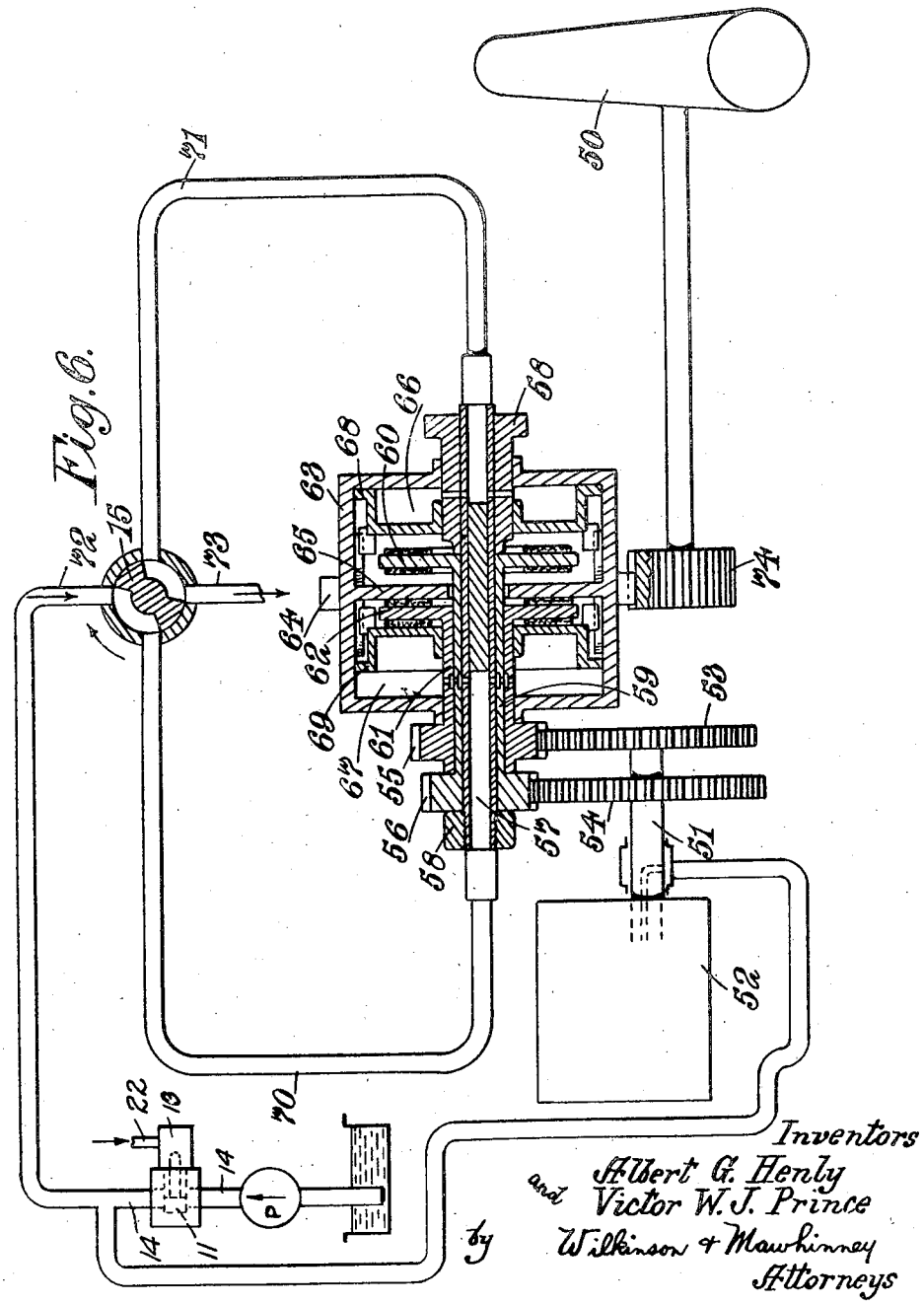

2,492,477

UNITED STATES PATENT OFFICE 2,492,477

HYDRAULICALLY ACTUATED APPARATUS

Albert George Henly and Victor William John Prince, Bristol, England, assignors to The Bristol Aeroplane Company Limited, Bristol, England, a company of Great Britain Application December 30, 1943, Serial No. 516,306 In Great Britain November 2, 1942

Section 1, Public Law 690, August 8, 1946 Patent expires November 2, 1962

7 Claims. (Cl. 123—119)

The invention concerns apparatus of the kind which is hydraulically actuated to perform an operation the effect of which is maintained whilst the pressure fluid is supplied to the apparatus. An example of such an apparatus is a hydraulically actuated friction clutch in which the clutch is engaged when pressure fluid is passed to the apparatus and remains so engaged whilst the pressure fluid is supplied thereto.

An object of the present invention is to ensure that the actuation of the apparatus is effected as rapidly as possible (which in the case of a hydraulically-actuated friction clutch will result in reduced wear of the clutch plates) and that the fluid pressure required to maintain the apparatus operative is as low as is practicable.

According to the invention, apparatus of the kind hereinbefore referred to is characterised in that the fluid which actuates the hydraulic mechanism and maintains it operative comes from the same source, the fluid being delivered to the mechanism at its full pressure during actuation thereof and at a lower pressure by pressure reducing means which is introduced to the fluid circuit after actuation has taken place.

Preferably said apparatus comprises a pair of hydraulically actuated friction clutches one of which becomes engaged as the other becomes disengaged and a valve which selectively controls the admission of fluid to and discharge of fluid from the hydraulic mechanism of said clutches, said selector valve being connected with said pressure reducing means whereby, when the selector valve is actuated to effect engagement of one clutch and disengagement of the other, the pressure reducing means is eliminated from the circuit.

According to another feature of the invention said pressure reducing means is incorporated in a valve which comprises a piston capable of endwise displacement with respect to a co-operating ported member, the piston in its normal position constraining the fluid to pass through a restricted passageway in the valve and in its displaced position enabling the fluid freely to pass through the valve.

Preferably the piston is maintained in its normal position by low pressure fluid which is introduced to the piston when the latter has been returned to its normal position.

A specific embodiment of the invention as applied to hydraulically actuated friction clutch apparatus forming part of the transmission to a supercharger for an internal combustion engine will now be described, by way of example, with reference to the accompanying drawing whereon:

Figure 1 is a half-view of the rear cover of the internal combustion engine showing the disposition thereon of the valves which are provided to control the actuation of said clutches and the connection between said valves;

Figure 2 is a section on the line II—II of Figure 1;

Figure 3 is a section on the line III—III of Figure 2;

Figure 4 is a section on the line IV—IV of Figure 2, and

Figure 5 is a sectional elevation showing a part of the apparatus of Figure 1;

Figure 6 is a diagram showing the supercharger drive diagrammatically.

The hydraulically-actuated friction clutch apparatus whose operation is to be controlled in acrordance with the present invention is shown diagrammatically in Figure 6 as applied to driving a supercharger 50 from the crankshaft 51 of an internal combustion engine 52. The drive comprises two gears 53 and 54 secured on the crankshaft and driving two pinions 55 and 56 at different speeds. The pinions are rotatable on a shaft 57 fixed in bearings 58. The pinion 56 is connected by a tubular shaft 59 to a clutch-plate 60 and is held by the bearings against axial movement while the pinion 55 is connected by a tubular shaft 61 to a second clutch-plate 62 and is also held against axial movement. A clutch casing 63 is mounted on the shaft 61 and one bearing 58 so that it can rotate and also move axially to a limited extent. This casing carries a gear ring 64 which meshes with a pinion 74 driving the supercharger 50. The casing carries a clutch-plate 65 to co-operate with either clutch-plate 60 or 62 and the latter are faced with friction material on both faces. The ends of the casing are formed as annular cylinders 66 and 67 in which two pistons 68 and 69 are mounted to slide. These pistons are splined to the casing to rotate therewith. The cylinders communicate through conduits in the shafts 57, 59 and 61 with pipes 70 and 71 respectively which connect to a valve 15. This valve is shown diagrammatically as a single semi-rotary valve.

In the position of the valve 15 shown, the pipe 70 is connected to an oil supply conduit 72 and the pipe 71 to an exhaust pipe 73. Oil under pressure is thus admitted to the cylinder 67 and moves the piston 69 to the right and the casing 63 to the left to engage the clutch 62, 65, 69 and couple the pinion 55 to the gear ring 64. The clutch 60, 65, 68 is disengaged by spring washers not shown. By reversing the valve 15, pressure oil can be admitted to the cylinder 66 to move the piston 68 to the left and the casing 63 to the right and engage the clutch 60, 65, 68 to couple the pinion 56 to the gear ring. The cylinder 67 is connected to exhaust so that the clutch 62, 65, 69 can disengage.

If the selector valve and hydraulically-actuated clutches were connected through a pressure fluid circuit, the pressure of which was constant, the friction-clutches would engage relatively slowly and rapid wear of the clutch-plates would follow. If the pressure of the fluid is increased, more rapid engagement is effected; it is found, however, that the quantity of fluid flowing through the circuit increases since the escape of fluid which occurs at leakage points and from bleed holes in the hydraulic mechanism is greater at the higher pressure. Consequently, to cope with this increased circulation, larger fluid supply and return pumps have to be provided.

The present invention aims at enabling rapid clutch engagement to take place whilst maintaining the fluid flow in the system at a low value. This is effected by providing a high fluid pressure for actuation of the clutch apparatus described in British Specification No. 465,612 and by incorporating a pressure-reducing valve in the fluid circuit. The reducing valve is such that it can be introduced and eliminated from the fluid circuit upon adjustment of a control valve.

The pressure-reducing valve is generally indicated at 10 in Figure 1 and the detailed construction is shown in Figure 5. There is shown in full lines in Figure 5 the position the valve components assume when the valve is inoperative to reduce the fluid pressure, whilst in chain-dotted lines on this figure is shown the position of the valve components whilst it is effecting said pressure reduction.

Referring to Figure 5, the reducing valve comprises a piston 11 which co-operates with a ported member 12 surrounding said piston, and a hydraulic motor 13 which forms an integral part of member 12. It will be noted that motor 13 is located at one end of member 12 and that the other end of the latter extends across a duct 14 through which fluid may flow from a feed pump (not shown) to the selector valve generally indicated at 15 (Figure 1) and thence to the hydraulic mechanism of the clutches. Ports 16 are formed in the wall of member 12 to permit this flow. The right hand end of the chamber 12, as shown in Figure 5, forms an opening which leads in any suitable manner to drain so that any oil leaking into the space at the right hand end of the chamber does not fill this space and result in a build up in pressure.

It will be appreciated from Figure 5 that when the piston 11 is in the chain dotted position it co-operates with ports 16 and partly closes the latter. As a consequence the pressure fluid moving along duct 14 in the direction of the arrow is constrained to pass through a reduced port opening. The size of the opening is such that the fluid passing to the hydraulic mechanism has a low pressure when the piston is in the chain dotted position. It will be appreciated of course that when the piston 11 assumes the position shown in full lines in Figure 5 the pressure fluid is enabled to pass through the full area of ports 16 and that its pressure is not so reduced and therefore the fluid is delivered to the hydraulic mechanism at a high pressure value.

The piston 11 is T-shaped and is so disposed that the head 17 is located within the ported part of the member 12 whilst the stem 18 of the piston extends therefrom to within the hydraulic motor 13 and constitutes the ram thereof. In its full line position, the piston 11 does not restrict the flow through the port 16 so that the fluid in the upper part of the duct 14 is under high pressure.

As shown in the drawings the piston 11 is hollow and has the stem closed whilst the head is open so that access to the inside of the piston may be had through said head. Lateral openings 19 in the wall of the stem of the piston 11 are provided so that, when the piston assumes the position shown in chain lines in Figure 5, said openings place the inside of the piston in communication with low pressure fluid which is lead into the annular passage 20 through a passage 39 from the upper part of the duct 14. When, however, the piston assumes the position shown in full lines in the figure, this communication with the fluid in passage 20 ceases and the inside of the piston is placed in communication with the pressure fluid moving in duct 14, by way of openings 19.

The hydraulic motor 13 comprises a chamber 21 and the stem 18 of the piston 11. The chamber communicates with a source of pressure fluid by way of pipe 22. Flow of fluid to and from the chamber is regulated by a control valve 23 (Figure 1) as will hereinafter be more fully described. From the above description it will be appreciated however, that when pressure fluid enters chamber 21 by pipe 22, piston 11 will be displaced from its normal position previously maintained by the low pressure fluid passing from passage 20 to within the piston by openings 19. In the displaced position referred to, openings 19 are placed in the way of fluid flowing along duct 14 so that, if the pressure fluid in chamber 21 is permitted slowly to escape it may be arranged to leak past the piston 27 into channel 35 and along pipe 36 to drain piston 11 will be gradually returned to its normal position by the pressure fluid from duct 14 acting on the inside of the piston.

The internal combustion engine with which the hydraulic clutch apparatus is associated, has a lubrication system, the oil of which is delivered from a feed pump at a high pressure: part of this high pressure oil is passed direct to certain engine components, the rest of the high pressure oil is passed to a pressure-reducing valve and the low pressure oil thus produced is directed to lubricate certain other components. This pressure-reducing valve is the valve 10 described above: the low-pressure oil leaving this valve by duct 14 is used for lubrication and also for maintaining the friction clutches engaged. The oil from duct 14 is led by a channel in the casing of the rear cover to the selector valve 15 and thence to the hydraulic clutches.

The selector valve 15 is rotated through 90° in one or other direction by means of a lever 24 (Figure 3) in order to disengage one clutch and engage the other clutch. The lever 24 is also secured to a cam 26 (Figures 2 and 3) which engages a piston 27 of the control valve 23. The piston 27 is formed with a central land 28 which under certain circumstances permits high pressure oil from pipe 29 (see Figures 1 and 2) to enter the piston barrel 30 by port 31 and escape by port 32 to pipe 22. The latter leads to the chamber 21 of the hydraulic motor 13.

A pump draws fluid from a reservoir and supplies it by duct 14 and pipe 72 to the selector valve 15 and hence to the hydraulically-actuated friction clutch mechanism (see Figure 6). The pressure reducing means and its associated hydraulic motor are shown diagrammatically in this figure and there is also shown a pipe which conveys pressure fluid from the delivery side of the pressure reducing means to the shaft 51 of the internal combustion engine 52. The shaft 51 is surrounded by a sleeve having an annular opening into which the pressure fluid from the pressure reducing means is directed. The annular passage communicates with a radially disposed hole in the shaft 51 which leads into a longitudinally disposed hole therein and thence to the lubricating system of the engine.

The control valve operates in the following manner:

When one of the hydraulic clutches is to be disengaged and the other engaged, lever 24 is actuated to rotate sleeve 25 and thereby set selector valve 15 to perform this operation. Each time sleeve 25 is rotated in this way, cam 26 is moved from the position shown in full lines to that shown in chain lines or vice versa and displaces piston 27 of control valve 23 from the normal position it assumes (as shown in full lines in Figure 2) to the position shown in chain lines in said figure. As a consequence, high pressure oil passes to pipe 22 from pipe 29 and thence to hydraulic motor 13.

The piston 11 of the reducing valve 10 is therefore moved toward the right (Figure 5) and the reducing valve put out of operation so that the oil leaving the reducing valve is at the high pressure. As a consequence, when the selector valve 15 is operated to change the gear ratio at which the supercharger is being driven by engaging one clutch and disengaging the other, the control valve 23 is simultaneously actuated to adjust the setting of the reducing valve 10 so that the clutch is engaged by the high pressure oil.

Since the reducing valve is common to the friction clutch hydraulic circuit and the circuit which feeds lubricating oil to certain of the engine components, then during engagement of one of the clutches, as described above, these components are subjected to the high pressure. This is found not to be disadvantageous provided that the act of changing gear is not unduly prolonged. However, in cases where it is preferred to ensure that the pressure of the oil in the lubricating circuit is maintained at the low value under all operating conditions, two such reducing valves may be provided, one in the friction clutch circuit and the other in the lubricating oil circuit.

When the clutch has been engaged at the high oil pressure, the pressure oil in motor 13 is permitted slowly to escape so that piston 11 may be returned to its normal position with the reducing valve in operation.

To ensure that this occurs, the piston 27 of the control valve 23 is made a loose fit in its barrel 30 so that when said piston is displaced by cam 26, the high pressure oil passing from port 31 to port 32 will slowly leak past the piston. This oil will act on the rear face of the piston to move the latter towards the cam. In doing so, the port 31 is closed by the returning piston 27 and thereafter the port 32 is placed in communication with an outlet 33 leading to the sump of the engine by way of passage 34, channel 35 and pipe 36 (see Figures 1 and 2). The oil from the hydraulic 13 is then free to pass through port 32 and thence to escape to the sump.

When piston 27 has been returned to its initial position against cam 26 the high pressure oil will continue to seep to the rear face thereof. If steps were not taken to provide an escape for this oil after a certain pressure had been attained, the load on the piston would be such that the force required to actuate the selector and control valves would be excessive. Accordingly, a ball valve 37 (Figure 4) is placed in a conduit 38 leading from the rear face of piston 27 to the passage 34. This passage then permits the oil passing valve 37 to escape to the engine sump when a predetermined pressure has been built up behind the piston.

With the arrangement described, the bringing of each hydraulic clutch into operation is performed at a high pressure, so that the time taken in engaging the clutch is a minimum. The pressure of the oil which maintains the clutches in engagement is low and thus the oil circulation in the engine is kept down. Since the means for bringing about the change in the oil pressure is operated in conjunction with the valve means provided for selecting the clutch which is to be engaged, it is ensured that the high pressure is always effective when, but only when, changing the gear ratio of the supercharger drive.

We claim:

1. Hydraulic apparatus comprising a hydraulic mechanism, a source of fluid under high pressure, a selector valve for admitting fluid from the source to the mechanism to actuate the mechanism and then to maintain it operative, pressure reducing means connected between the fluid source and the hydraulic mechanism, said pressure reducing means being arranged normally in a position to reduce the pressure of the fluid which acts on the hydraulic mechanism to maintain it operative, a hydraulic motor for setting the pressure reducing means to a second position to permit the high pressure fluid to act on the hydraulic mechanism, a control valve actuated conjointly with the selector valve for admitting fluid from the source to said hydraulic motor and means to permit the escape of fluid from the hydraulic motor whereby the pressure reducing means is returned to its normal setting after actuation of the hydraulic mechanism.

2. Hydraulic apparatus as claimed in claim 1, wherein the hydraulic mechanism comprises a pair of hydraulically-actuated friction clutches one of which is engaged as the other is disengaged and wherein the selector valve effects such simultaneous engagement and disengagement of the clutches.

3. Hydraulic apparatus as claimed in claim 1 wherein said pressure reducing means comprises a piston capable of endwise movement with respect to a co-operating ported member, the piston in its normal setting constraining the high pressure fluid to pass to the hydraulic mechanism through a restricted passageway and in its displaced position enabling the high pressure fluid to pass freely to the hydraulic mechanism.

4. Hydraulic apparatus as claimed in claim 1 wherein the pressure reducing means is returned to its normal position by the pressure fluid passing from the fluid source to the hydraulic mechanism.

5. Hydraulic apparatus as claimed in claim 1 wherein the control valve is mechanically opened to permit the passage of pressure fluid to the hydraulic motor and is returned to its closed position by the fluid passing to said motor.

6. Hydraulic apparatus as claimed in claim 1 wherein the control valve comprises a cylindrical housing, a piston valve which is a loose fit within the housing and means interconnecting the hydraulic motor with the cylindrical housing so that the pressure fluid to the motor is applied to the housing to act on the end of the piston valve and move the latter to the closed position.

7. Hydraulic apparatus as claimed in claim 1 wherein the hydraulic mechanism comprises a pair of hydraulically-actuated friction clutches forming a part of the transmission drive between an internal combustion engine and a supercharger and wherein the pressure fluid leaving the pressure reducing means is directed in part to the hydraulic mechanism and in part to the engine lubrication system.

ALBERT GEORGE HENLY.
VICTOR WILLIAM JOHN PRINCE.

REFERENCES CITED

The following references are of record in the file of this patent:

FOREIGN PATENTS

| Number | Country | Date |
|---|---|---|
| 408,900 | Great Britain | Apr. 19, 1934 |